(12) United States Patent
Okada

(10) Patent No.: US 10,593,194 B2
(45) Date of Patent: Mar. 17, 2020

(54) POWER SUPPLY CONTROL MODULE

(71) Applicant: TOYOTA JIDOSHA KABUSHIKI KAISHA, Toyota-shi, Aichi-ken (JP)

(72) Inventor: Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 16/004,107

(22) Filed: Jun. 8, 2018

(65) Prior Publication Data

US 2019/0035260 A1   Jan. 31, 2019

(30) Foreign Application Priority Data

Jul. 25, 2017   (JP) .................................. 2017-143667

(51) Int. Cl.
```
G08C 17/02      (2006.01)
H01M 2/10       (2006.01)
H01M 10/42      (2006.01)
H01M 2/34       (2006.01)
B60R 25/40      (2013.01)
H01M 10/48      (2006.01)
H01H 47/00      (2006.01)
```
(52) U.S. Cl.
CPC .......... *G08C 17/02* (2013.01); *H01M 2/1044* (2013.01); *H01M 10/425* (2013.01); *B60R 25/406* (2013.01); *H01H 47/00* (2013.01); *H01M 2/34* (2013.01); *H01M 10/48* (2013.01); *H01M 2010/4278* (2013.01)

(58) Field of Classification Search
USPC ......................................................... 307/116
See application file for complete search history.

(56) References Cited

U.S. PATENT DOCUMENTS

2016/0063784 A1    3/2016  Murakami et al.
2016/0365739 A1*  12/2016  Lewis .................... G08C 17/02

FOREIGN PATENT DOCUMENTS

| EP | 1 707 102 A1 | 10/2006 |
| JP | 2012-227586 A | 11/2012 |
| JP | 2014-205978 A | 10/2014 |
| JP | 2015-177939 A | 10/2015 |

* cited by examiner

*Primary Examiner* — Rexford N Barnie
*Assistant Examiner* — Xuan Ly
(74) *Attorney, Agent, or Firm* — Oliff PLC

(57) ABSTRACT

A power supply control module includes a first sheet portion, a second sheet portion, a wireless communication unit, a switch unit and a controller. The controller configured to cause the switch unit to switch between a closed state and an opened state based on the result of communication performed by the wireless communication unit, the closed state being a state in which a first cell side electrode layer and a terminal side electrode layer are electrically connected to each other and the opened state being a state in which the first cell side electrode layer and the terminal side electrode layer are electrically disconnected from each other.

10 Claims, 7 Drawing Sheets

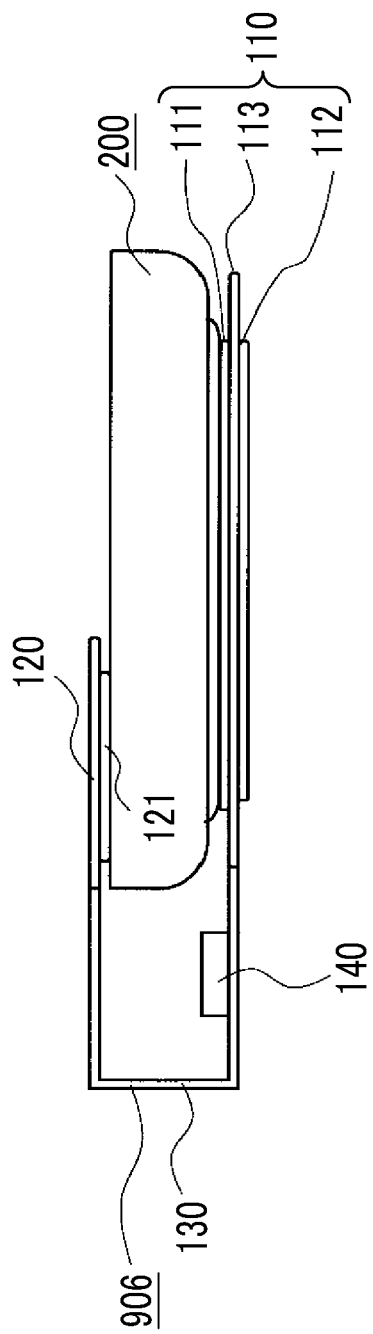

— POWER SUPPLY CONTROL MODULE —

INCORPORATION BY REFERENCE

The disclosure of Japanese Patent Application No. 2017-143667 filed on Jul. 25, 2017 including the specification, drawings and abstract is incorporated herein by reference in its entirety.

BACKGROUND

1. Technical Field

The disclosure relates to a power supply control module which is used for a vehicle electronic key or the like.

2. Description of Related Art

In a small electronic device such as a vehicle electronic key, a small cell that is called a coin cell or a button cell is used as a power source. The electronic key performs wireless communication with a vehicle or the like by using power from the small cell. The electronic key performs the wireless communication for an operation of locking or unlocking doors of the vehicle or the like. In a case where the vehicle is not used, a process such as communication is not needed and thus it is desired to disable a communication function or the like. In the related art, a technique in which an electronic key has a function of disabling at least a portion of a communication function has been proposed.

Japanese Unexamined Patent Application Publication No. 2014-205978 (JP 2014-205978 A) discloses a technique, in which electric connection between a cell and an electronic circuit is cut off such that power is saved when a controller of a portable device (electronic key) for smart entry detects that the capacity of the cell is equal to or lower than a standard value.

Japanese Unexamined Patent Application Publication No. 2012-227586 (JP 2012-227586 A) discloses a technique, in which power is supplied to a wireless receiver from a cell when a controller of a portable wireless communication device (electronic key) determines that vibration is being transferred based on voltage output from a vibration-based power generation device and power supply is stopped when the controller determines that vibration is not being transferred such that power is saved in a case where it is assumed that communication is not needed to be performed.

Meanwhile, an electronic device including a wireless receiver that is accommodated in a cell-driven device along with a cell has been proposed (Japanese Unexamined Patent Application Publication No. 2015-177939 (JP 2015-177939 A)). Such an electronic device can receive a radio signal from an external device and can control the output from the cell with respect to the device based on the radio signal.

SUMMARY

However, in the case of the related art as disclosed in JP 2014-205978 A and JP 2012-227586 A, it is difficult to start power saving or stop power saving at an exact timing intended by a user. It is also difficult to provide a small electronic key with a button or the like for turning on or off the electronic key. The electronic device as disclosed in JP 2015-177939 A has a structure in which an AAA battery is built into a casing that has the same shape as an AA battery, for example. Regarding the above-described electronic device, when the same structure as described above is adopted for a coin cell, there is a decrease in size of the coin cell, which results in an extreme decrease in capacity and loss of practicality. Therefore, it is difficult to apply the above-described structure to a small electronic key for which a coin cell is used.

The disclosure provides a power supply control module that can be easily applied to a small device such as an electronic key for which a coin cell is used and with which power supply from a cell to a device can be externally controlled.

An aspect of the disclosure relates to a power supply control module configured to be accommodated in a cell holder in a state of being attached to a coin cell in a vehicle electronic key in which the cell holder accommodates the coin cell of which a first pole is an electrode including the central portion of a first surface and of which a second pole is an electrode including a second surface that faces the first surface, a side surface, and a portion of the first surface that is positioned outward of the first pole. The power supply control module includes a first sheet portion provided with a first cell side electrode layer connected to the first pole of the coin cell, a terminal side electrode layer connected to a first pole side terminal of the cell holder, and an insulating layer configured to insulate the first cell side electrode layer and the terminal side electrode layer from each other, a second sheet portion provided with a second cell side electrode layer connected to a portion of the second surface of the coin cell, a wireless communication unit configured to be disposed in the vicinity of the side surface of the coin cell positioned between an edge of the first sheet portion and an edge of the second sheet portion and to perform wireless communication with an external device, a switch unit configured to switch between a closed state and an opened state, the closed state being a state in which the first cell side electrode layer and the terminal side electrode layer are electrically connected to each other and the opened state being a state in which the first cell side electrode layer and the terminal side electrode layer are electrically disconnected from each other, and a controller configured to cause the switch unit to switch between the closed state and the opened state based on the result of communication performed by the wireless communication unit.

As described above, the power supply control module is configured with the sheet-shaped first sheet portion, the sheet-shaped second sheet portion, and the small controller or the like disposed in the vicinity of the side surface of the coin cell. Therefore, the power supply control module can be more smoothly accommodated in the cell holder of the electronic key even in a case where the power supply control module is attached to the coin cell, and power supply from a cell to the electronic key can be externally controlled.

In the power supply control module according to the aspect of the disclosure, the insulating layer may be configured to cover the entire first pole when the power supply control module is attached to the coin cell and the first sheet portion may be configured not to stick out beyond the first surface of the coin cell when the insulating layer covers the entire first pole.

In this case, since the insulating layer covers the entire first pole of the coin cell, it is possible to further reduce a possibility that a terminal of the cell holder comes into direct contact with the first pole. Since the first sheet portion does not stick out beyond the first surface, the power supply control module can be more smoothly accommodated in the cell holder.

In the power supply control module according to the aspect of the disclosure, the wireless communication unit may be configured to communicate with a portable wireless communication terminal device as the external device.

In this case, it is possible to use a general and popular electronic device such as a smartphone as the external device, and thus convenience is further improved.

In the power supply control module according to the aspect of the disclosure, the controller may be configured to: perform predetermined verification between the power supply control module and the external device; cause the wireless communication unit to perform encrypted communication based on the verification in a case where the verification is successful; and cause the switch unit to switch between the closed state and the opened state based on the result of the encrypted communication.

In this case, there is a further improvement in security and it is possible to more reliably suppress damage caused by power supply control that is performed by another person as mischief.

In the power supply control module according to the aspect of the disclosure, the controller may be configured to detect a potential difference between the first cell side electrode layer and the terminal side electrode layer and may be configured to cause the wireless communication unit to transmit a signal indicating that there is a short circuit between the first cell side electrode layer and the terminal side electrode layer to the external device in a case where the switch unit is in the opened state and the potential difference is zero.

In this case, a user can be aware of that there is a short circuit in the power supply control module.

In the power supply control module according to the aspect of the disclosure, the insulating layer may be formed of polyimide.

In this case, the insulating layer has favorable insulating properties.

In the power supply control module according to the aspect of the disclosure, the first sheet portion, the second sheet portion, and a bridge portion configured to connect the first sheet portion and the second sheet portion to each other may be formed by using a flexible board, and the wireless communication unit, the switch unit, and the controller may be disposed on the bridge portion.

In this case, it is possible to form the power supply control module to be thinner and lighter and it is possible to form the power supply control module to be easily bent and to be easily attached to the coin cell.

In the power supply control module according to the aspect of the disclosure, the first sheet portion may be provided with an outer edge of which a portion is curved inward.

In the power supply control module according to the aspect of the disclosure, a hole may be formed in the first sheet portion.

In this case, it is possible to attach the first sheet portion to the coin cell by attaching an insulating tape such that a portion of the outer edge that is curved inward or the hole is covered.

In the power supply control module according to the aspect of the disclosure, the second sheet portion may be provided with a gap filling member on a surface that is on a side opposite to the second cell side electrode layer side, the gap filling member having a predetermined thickness, cushioning properties, and elasticity.

According to the aspect of the disclosure, it is possible to provide a power supply control module that can be easily applied to a small device such as an electronic key for which a coin cell is used and with which power supply from a cell to a device can be externally controlled.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 illustrates a side view of a power supply control module according to still another modification example of the embodiment.

DETAILED DESCRIPTION OF EMBODIMENTS

Outline

A power supply control module according to an embodiment of the disclosure is formed to be thinner and smaller such that the power supply control module can be accommodated in an existing cell holder in a state of being attached to an existing coin cell. A first sheet portion of the power supply control module is interposed between a first pole of the coin cell and a terminal of the cell holder and is provided with a switch unit that controls electrical connection and disconnection between the first pole of the coin cell and the terminal of the cell holder. A second sheet portion is connected to a portion of a second pole of the coin cell. The power supply control module is provided with a wireless communication unit that performs wireless communication with an external device and the switch unit is operated based on the wireless communication. The power supply control module can be accommodated in a cell holder of an electronic key more smoothly and power supply from a cell to the electronic key can be externally controlled.

Hereinafter, an embodiment of the disclosure will be described in detail with reference to drawings.

EMBODIMENT

Structure

Figure 1:
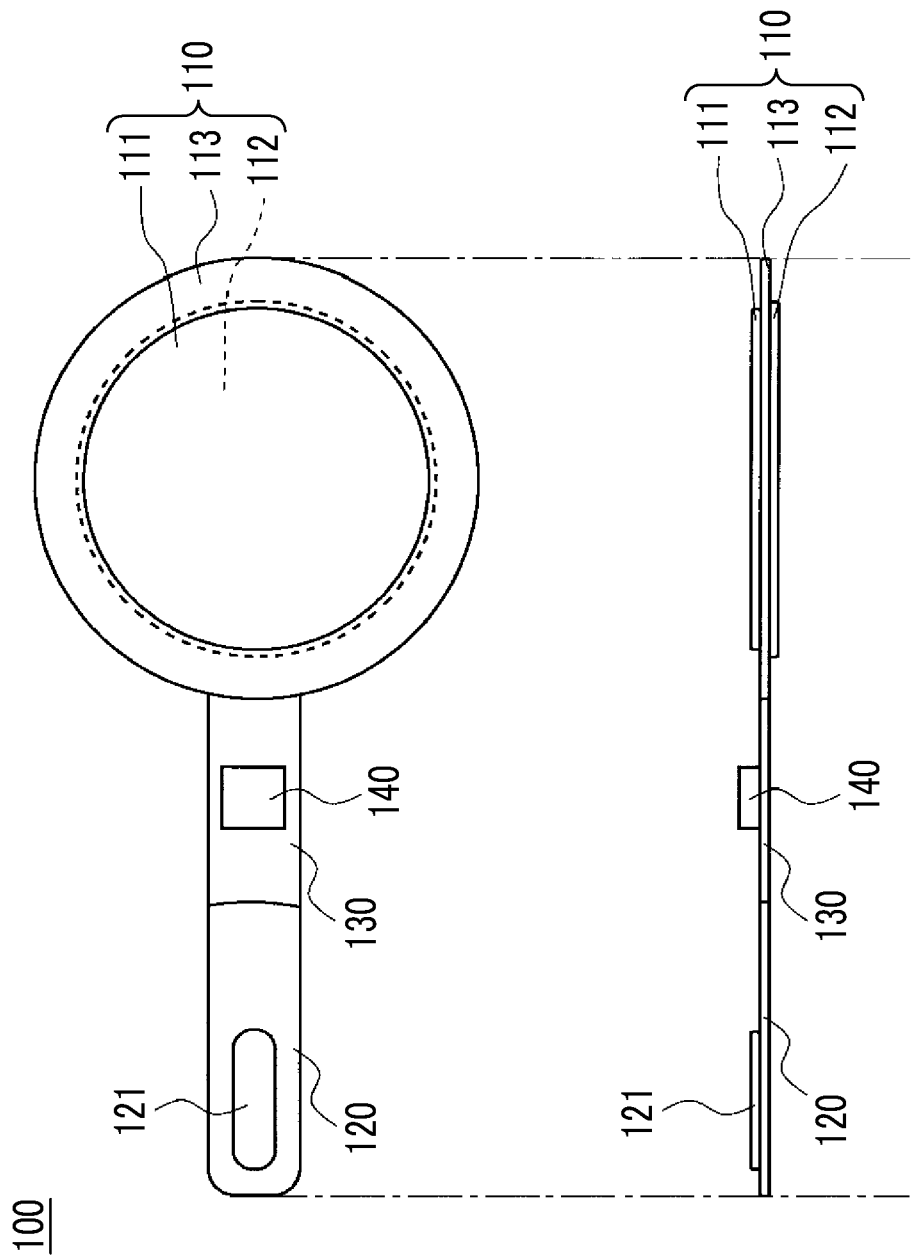
FIG. 1 illustrates a plan view and a side view of a power supply control module according to an embodiment.

FIG. 1 illustrates a plan view and a side view of a power supply control module 100 according to the embodiment. The power supply control module 100 is formed by using, for example, a flexible board and is provided with a first sheet portion 110 and a second sheet portion 120. The power supply control module 100 is provided with a bridge portion 130 that connects the first sheet portion 110 and the second sheet portion 120 to each other and one or more component chips 140 are mounted on the bridge portion 130. Since the power supply control module 100 is formed by using the flexible board, it is possible to form the power supply control module 100 to be thinner, lighter, and smaller and the power supply control module 100 is easily bent. Therefore, it is possible to facilitate attaching the power supply control module 100 to a coin cell 200 and accommodating the power supply control module 100 in a cell holder.

The first sheet portion 110 is provided with a first cell side electrode layer 111, a terminal side electrode layer 112, and an insulating layer 113 that is provided between the first cell side electrode layer 111 and the terminal side electrode layer 112. The insulating layer 113 can be configured with polyimide material of the flexible board, for example. The second sheet portion 120 is provided with a second cell side electrode layer 121.

The component chip 140 includes a circuit on which a wireless communication unit which will be described later, a switch unit, and a controller are mounted. FIG. 1 illustrates an example in which the above-described components are integrally mounted in one component chip 140. However, the above-described components may be dispersed into two or more component chips 140. The component chip 140 is connected to the first cell side electrode layer 111, the terminal side electrode layer 112, and the second cell side electrode layer 121 by a power line (not shown). In side views in FIG. 1 and the subsequent drawings, the thickness of each component is different from the actual thickness and is appropriately schematically illustrated such that a layer configuration can be recognized.

Figure 2:
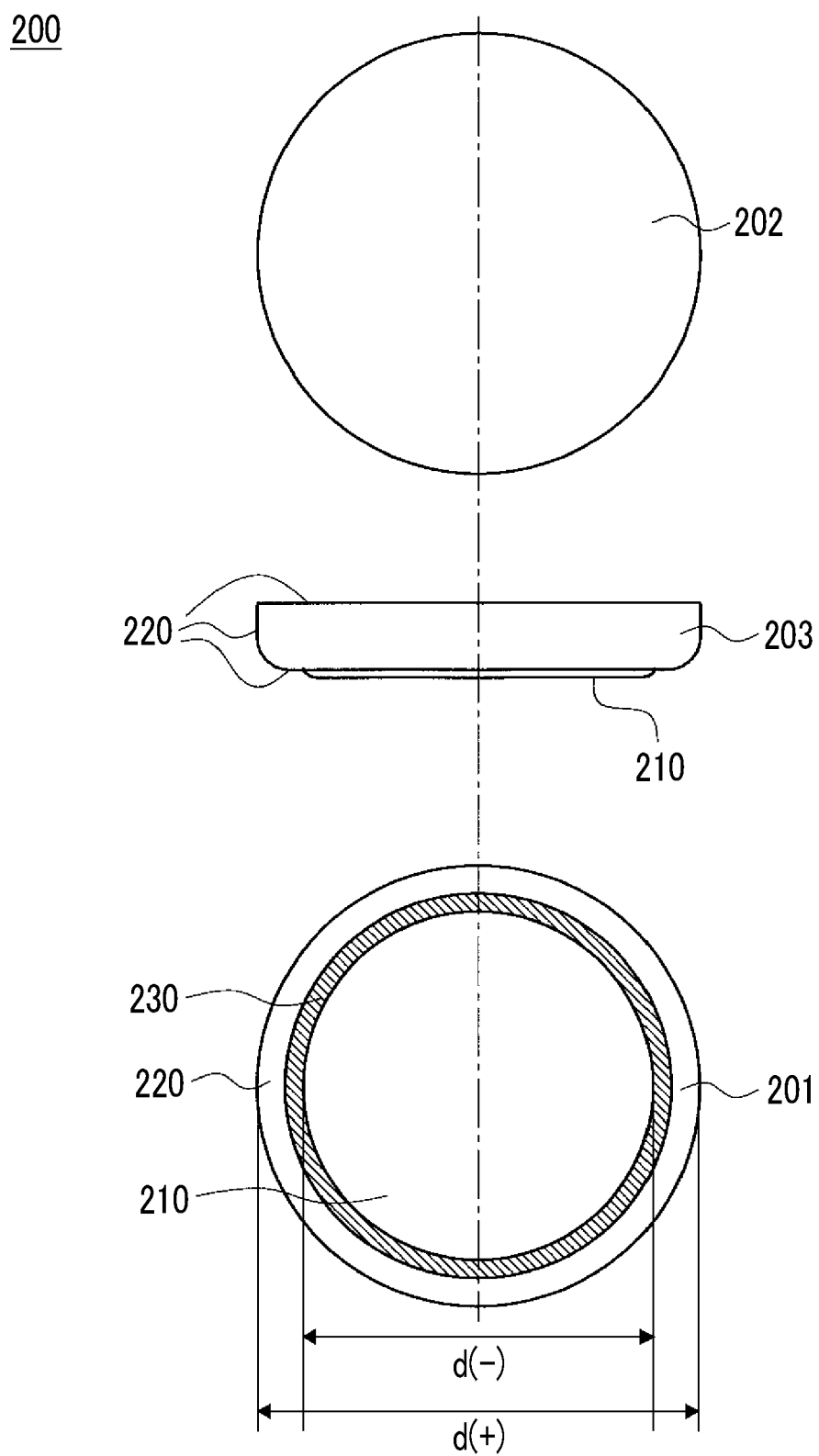
FIG. 2 illustrates a plan view, a side view, and a bottom view of a general coin cell.

FIG. 2 illustrates a plan view, a side view, and a bottom view of a general coin cell 200. The coin cell 200 has a columnar shape and the central portion of a first surface 201, which is a bottom surface, is a first pole 210 and a second surface 202, which is an upper surface, a side surface 203, and a portion of the first surface 201 that is positioned outward of the first pole 210 are a second pole 220. An insulating portion 230 is provided between the first pole 210 of the first surface 201 and the second pole 220.

Figure 3:
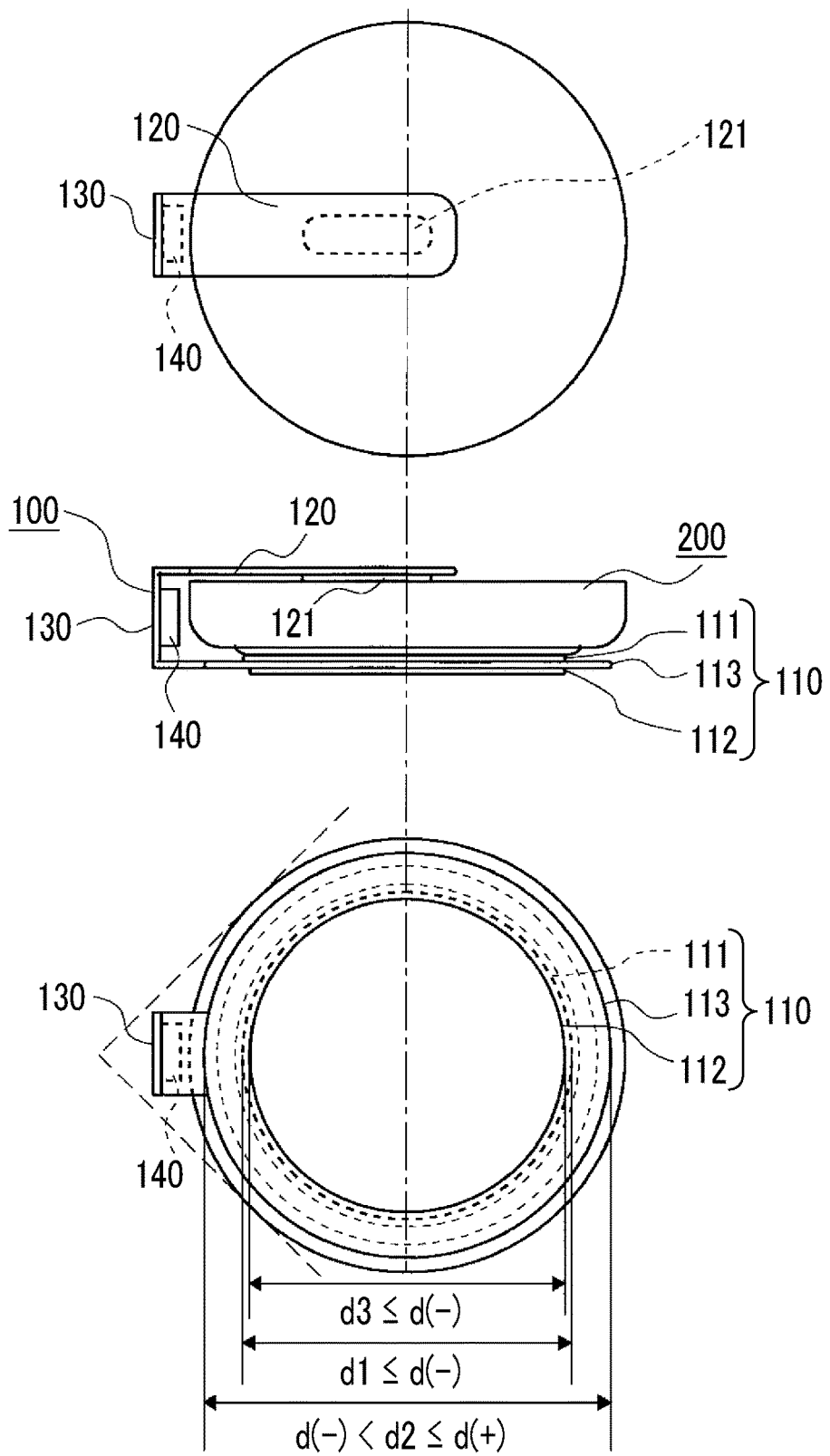
FIG. 3 illustrates a plan view, a side view, and a bottom view of the power supply control module according to the embodiment in a state of being attached to the coin cell.

FIG. 3 illustrates a plan view, a side view, and a bottom view of the power supply control module 100 in a state of being attached to the coin cell 200. As illustrated in FIG. 2 and FIG. 3, the first cell side electrode layer 111 of the first sheet portion 110 of the power supply control module 100 is attached to the first pole 210 of the coin cell 200. The second cell side electrode layer 121 of the second sheet portion 120 is attached to a portion of the second surface 202, which is a portion of the second pole 220.

The power supply control module 100 is folded at the bridge portion 130 and the component chip 140 is disposed on a portion of the bridge portion 130 that faces the side surface 203 of the coin cell 200 while being substantially parallel to the side surface 203. As described above, the component chip 140 can be manufactured to be sufficiently small to such an extent that the height of the coin cell 200 is not exceeded and the component chip 140 can be disposed in the vicinity of the side surface 203 between an edge of the first sheet portion 110 and an edge of the second sheet portion 120.

The first sheet portion 110 and the second sheet portion 120 can be manufactured to be sufficiently thin to such an extent that there is no hindrance even when the first sheet portion 110 and the second sheet portion 120 are present between a cell holder of an electronic key 300 and the coin cell 200. For example, the insulating layer 113, which is a portion of the first sheet portion 110, preferably has a size and a shape such that the insulating layer 113 can cover the entire first pole 210 of the coin cell 200. For example, the first sheet portion 110 preferably has a size and a shape such that the entire first sheet portion 110 does not stick out beyond the first surface 201 of the coin cell 200. For example, the terminal side electrode layer 112 preferably has a size and a shape such that the terminal side electrode layer 112 can be included in the first pole 210. Since the insulating layer 113 covers the entire first pole 210, it is possible to further reduce a possibility that a terminal of the cell holder comes into direct contact with the first pole 210. Since the first sheet portion 110 does not stick out beyond the first surface 201, the power supply control module 100 can be more smoothly accommodated in the cell holder. Since the terminal side electrode layer 112 is not provided outward of the first pole 210, it is possible to suppress contact between the terminal side electrode layer 112 and a second pole side terminal of the cell holder even when the second pole side terminal is close to the terminal side electrode layer 112.

For example, it is preferable that the first cell side electrode layer 111 has a circular shape with a diameter d1 that is equal to or smaller than a diameter d(−) of the first pole 210, the insulating layer 113 has a circular shape with a diameter d2 that is larger than the diameter d(−) and is equal to or smaller than an outer diameter d(+) of the coin cell 200, the terminal side electrode layer 112 has a circular shape with a diameter d3 that is equal to or smaller than the diameter d(−) of the first pole 210, and the first cell side electrode layer 111, the insulating layer 113, and the terminal side electrode layer 112 are concentrically disposed in a plan view.

As illustrated in FIG. 3, the bridge portion 130 preferably has a size such that the bridge portion 130 is positioned within a corner portion of a square that circumscribes the coin cell 200 as illustrated in FIG. 3 when the bridge portion 130 is folded. Since a general cell holder of the coin cell 200 has a shape in which a space corresponding to approximately one corner portion is present in the vicinity of the coin cell 200. The cell holder can accommodate the bridge portion 130 in a favorable manner when the bridge portion 130 has a size as described above.

Function

Figure 4:
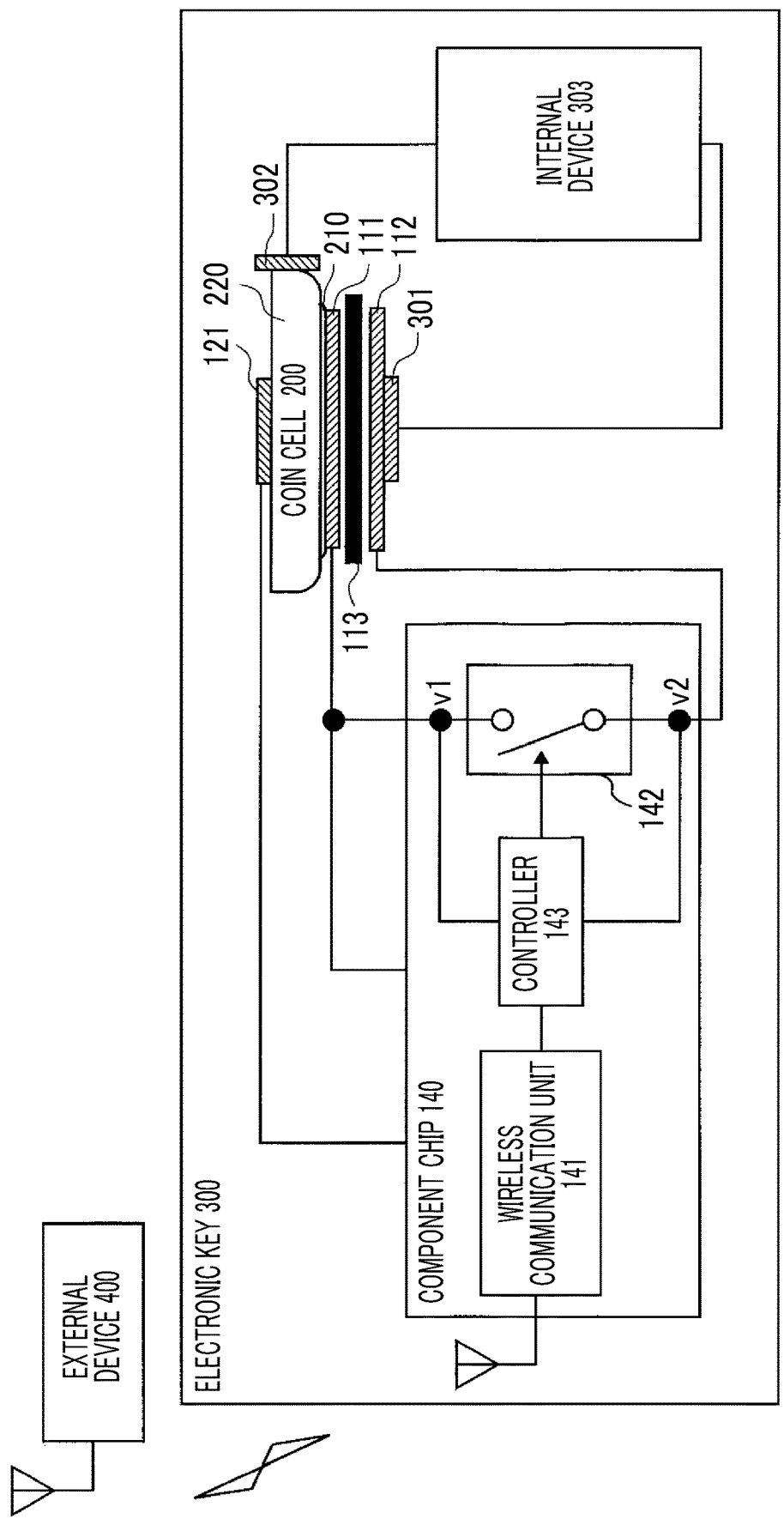
FIG. 4 illustrates a schematic configuration diagram of the power supply control module according to the embodiment, the coin cell, an electronic key into which the power supply control module and the coin cell are built, and an external device.

FIG. 4 illustrates a schematic configuration diagram of the power supply control module 100, the coin cell 200, the electronic key 300 into which the power supply control module 100 and the coin cell 200 are built, and an external device 400.

A power line from the first cell side electrode layer 111 that is connected to the first pole 210 of the coin cell 200 and a power line from the second cell side electrode layer 121 that is connected to the second pole 220 are connected to the component chip 140 such that power is appropriately supplied to a wireless communication unit 141, a switch unit 142, and a controller 143. A power line in the component chip 140 is not illustrated. An antenna cable of the wireless communication unit 141 may extend from the component chip 140.

A first pole side terminal 301 of the electronic key 300 is connected to the terminal side electrode layer 112 of the power supply control module 100 instead of the first pole 210 of the coin cell 200. Meanwhile, a second pole side terminal 302 of the electronic key 300 is directly connected to the second pole 220 of the coin cell 200. Since the second sheet portion 120 is attached to a portion of the second surface 202 and the rest of the second surface 202 is not covered, there is no case where the second pole side terminal 302 cannot come into contact with the second pole 220 at all. When the switch unit 142 is in a closed state, the first pole side terminal 301 and the first pole 210 of the coin cell 200 are electrically connected to each other and power is supplied to an internal device 303 of the electronic key 300 such that the electronic key 300 enters a turned-on state. When the switch unit 142 is in an opened state, the first pole side terminal 301 and the first pole 210 of the coin cell 200 are not electrically connected to each other and power is not supplied to the internal device 303 of the electronic key 300 such that the electronic key 300 enters a turned-off state.

The wireless communication unit 141 performs wireless communication with the external device 400 on the outside of the electronic key 300. The switch unit 142 switches between the closed state in which the first cell side electrode layer 111 and the terminal side electrode layer 112 are electrically connected to each other and the opened state in which the first cell side electrode layer 111 and the terminal side electrode layer 112 are electrically disconnected. The controller 143 controls the state of the switch unit 142 based on the result of communication performed by the wireless communication unit 141.

The external device 400 with which the wireless communication unit 141 communicates is a portable wireless communication terminal device such as a smartphone. When a user performs an operation of instructing the smartphone to turn off the electronic key 300, the smartphone transmits a turning off signal to instruct the electronic key 300 to be turned off in a wireless manner. When the wireless communication unit 141 receives the turning off signal with the electronic key 300 being in the turned-on state, the controller 143 detects the turning off signal and causes the switch unit 142 to enter the opened state. Accordingly, the electronic key 300 enters the turned-off state. When the user performs an operation of instructing the smartphone to turn on the electronic key 300, the smartphone transmits a turning on signal to instruct the electronic key 300 to be turned on in a wireless manner. When the wireless communication unit 141 receives the turning on signal with the electronic key 300 being in the turned-off state, the controller 143 detects the turning on signal and causes the switch unit 142 to enter the closed state. Accordingly, the electronic key 300 enters the turned-on state. As described above, the power supply control module 100 can control power supply to the electronic key 300 from the coin cell 200 based on a radio signal from the external device 400.

In order to achieve improvement in security such as suppression of damage caused by mischief made by another person, the wireless communication unit 141 may perform encrypted communication with the external device 400. That is, the controller 143 may perform verification by means of code collation or the like between the power supply control module 100 and the external device 400, continue the encrypted communication in a case where the verification is successful, and control the state of the switch unit 142 based on the result of the encrypted communication.

The wireless communication unit 141 and the external device 400 perform communication conforming to a short distance communication standard such as Bluetooth (registered trademark), for example. In a case where the external device 400 is a smartphone, the smartphone can provide an operation interface to a user in a favorable manner by executing a predetermined application for controlling the power supply control module 100 that is installed in advance. Since a general portable wireless communication terminal device such as the smartphone is used as the external device 400, a user does not need to obtain and carry a separate single-purpose device, and thus convenience can be further improved.

When a potential difference between the first cell side electrode layer 111 and the terminal side electrode layer 112 is zero and the switch unit 142 is in the opened state, it can be deduced that there is a short circuit between the first cell side electrode layer 111 and the terminal side electrode layer 112. In this case, the electronic key 300 enters the turned-on state regardless of the state of the switch unit 142 and a power saving function is deteriorated. As illustrated in FIG. 4, the controller 143 may be configured to monitor a potential difference between a potential v1 of the first cell side electrode layer 111 and a potential v2 of the terminal side electrode layer 112 and to cause the wireless communication unit 141 to transmit a radio signal indicating that there is a short circuit to the external device 400 when the potential difference is zero and the switch unit 142 is in the opened state. Accordingly, the user can be aware of a malfunction of the power supply control module 100 via the external device 400.

Hereinafter, a modification example of the power supply control module 100 will be described. The same constituent elements as those in the power supply control module 100 or corresponding constituent elements will be appropriately given the same reference symbols.

Modification Examples 1, 2, and 3

Figure 5:
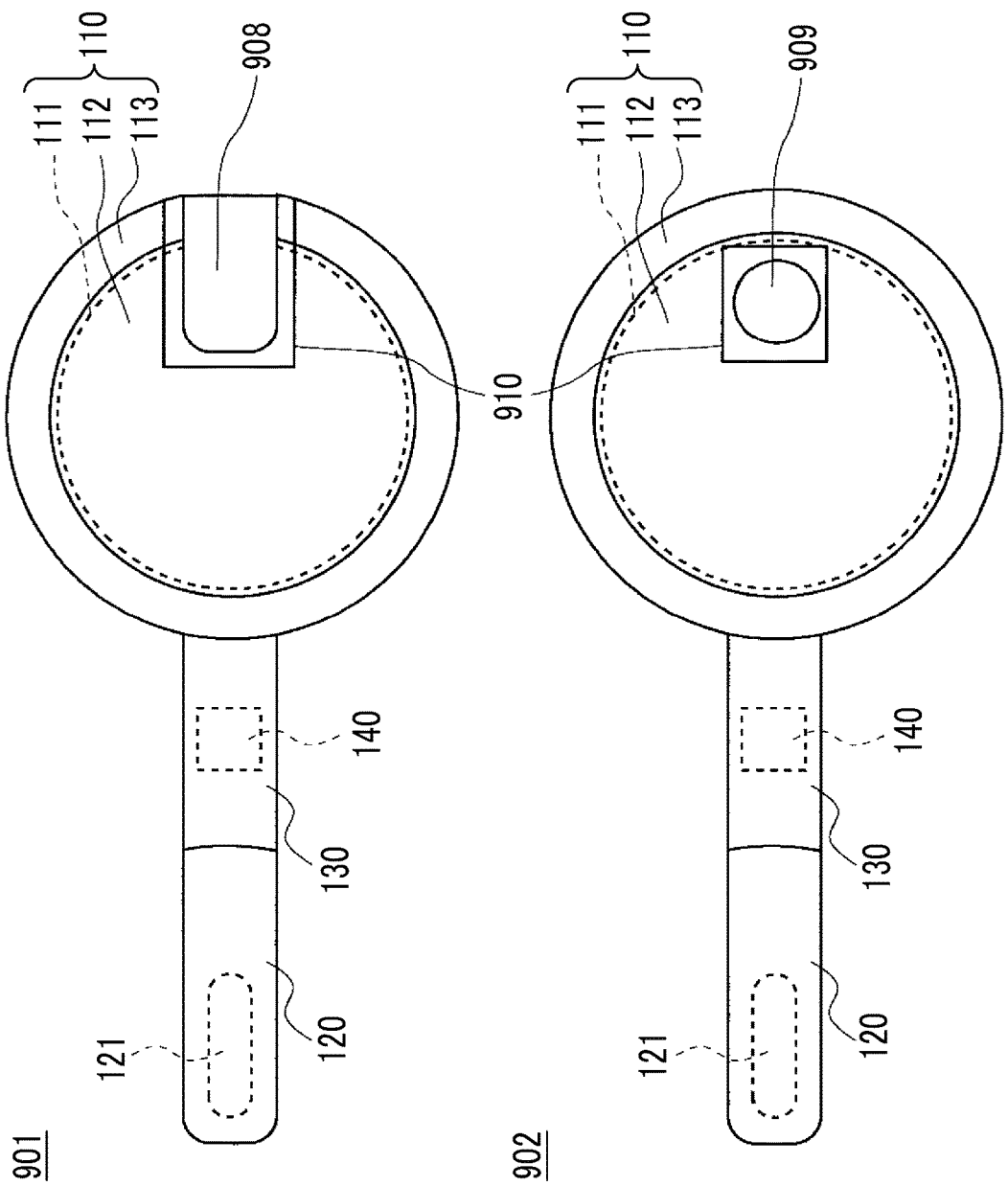
FIG. 5 illustrates a bottom view of power supply control modules according to modification examples of the embodiment.

The adhesive strengths of the first sheet portion 110 and the second sheet portion 120 of the power supply control module 100 with respect to the coin cell 200 may be appropriately designed by selecting material or the like in consideration of a property of being easy to be attached, a property of being less likely to fall off, and reduction in contact resistance. The following modification examples 1, 2, and 3 are examples in which adjustment of adhesive strength and contact pressure is particularly easy. FIG. 5 illustrates a bottom view of power supply control modules 901, 902 according to the modification examples 1 and 2 of the embodiment. The power supply control modules 901, 902 are obtained by providing a notch 908 or a cut 909 in a portion of the first sheet portion 110 of the power supply control module 100 illustrated in FIG. 1. That is, in the case of the power supply control module 901, the first sheet portion 110 has an outer edge of which a portion is curved inward. In the case of the power supply control module 902, the first sheet portion 110 is provided with a hole. It is possible to attach the first sheet portion 110 to the coin cell 200 by attaching an insulating tape 910 from the terminal side electrode layer 112 side such that the notch 908 (portion of outer edge that is curved inward) or the cut 909 (hole) is covered.

Figure 6:
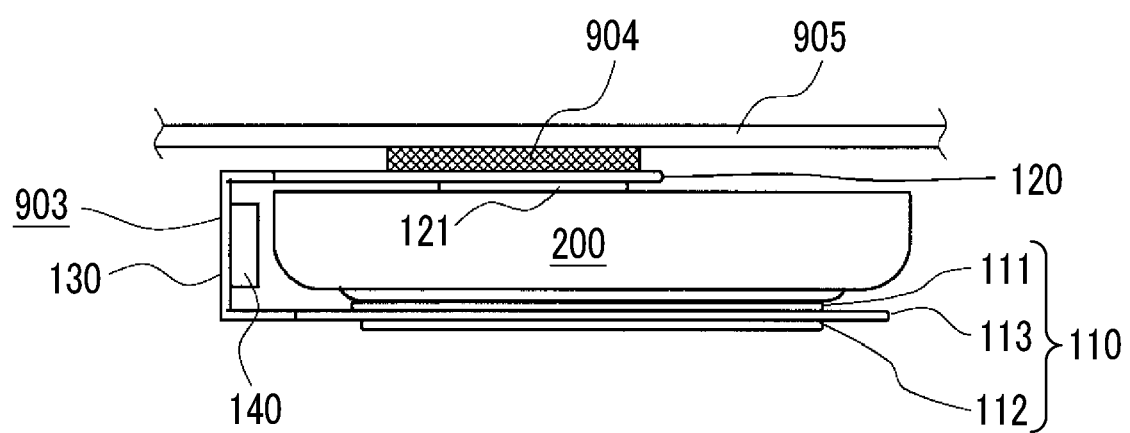
FIG. 6 illustrates a side view of a power supply control module according to another modification example of the embodiment.

FIG. 6 illustrates a side view of a power supply control module 903 according to the modification example 3 of the embodiment in a state of being attached to the coin cell 200. The power supply control module 903 is obtained by providing a gap filling member 904 on a surface of the second sheet portion 120 of the power supply control module 100 illustrated in FIG. 1 that is opposite to a surface of the second sheet portion 120 of the power supply control module 100 that comes into contact with the second pole 220. The gap filling member 904 has a predetermined thickness, cushioning properties, and elasticity. The gap filling member 904 is formed of, for example, sponge and fills a gap between a cell holder or a casing 905 of the electronic key 300 and the second sheet portion 120 such that the second sheet portion 120 is pressed against the coin cell 200 at a constant pressure and the second sheet portion 120 stably comes into the contact with the coin cell 200.

Modification Example 4

FIG. 7 illustrates a side view of a power supply control module 906 according to a modification example 4 of the embodiment in a state of being attached to the coin cell 200. The power supply control module 906 is obtained by disposing the component chip 140 on a portion of the bridge portion 130 of the power supply control module 100 that is on the same plane as the first sheet portion 110. When the component chip 140 is disposed as described above, since the component chip 140 and a wire in the vicinity of the component chip 140 are disposed in a planar manner, a stress is less likely to act and reliability becomes more excellent than that of the power supply control module 100 but a larger accommodation space is needed. In the modification example 4, it is possible to further improve the reliability of the component chip 140 by adjusting the length of the bridge portion 130 or shifting a position at which the second sheet portion 120 is attached to the second pole 220 of the coin cell 200 within an allowable range determined based on the space of the cell holder.

Effect

Since the power supply control module according to the embodiment of the disclosure is provided with the flat first sheet portion, the flat second sheet portion, and the small component chip, the power supply control module can be more smoothly accommodated in the cell holder even in a case where the power supply control module is attached to a coin cell in the related art. Therefore, it is also possible to easily apply the power supply control module to an existing electronic key for which a coin cell is used. Since it is possible to perform turning-on/off control by using the external device, the user can easily perform power supply control at a desired timing via the interface that can be easily operated.

The embodiment of the disclosure is useful for power supply control of a small device such as a vehicle electronic key.

What is claimed is:

1. A power supply control module configured to be accommodated in a cell holder in a state of being attached to a coin cell in a vehicle electronic key in which the cell holder accommodates the coin cell of which a first pole is an electrode including a central portion of a first surface and of which a second pole is an electrode including a second surface that is on an opposite side of the coin cell from the first surface, a side surface, and a portion of the first surface that is positioned outward of the first pole, the power supply control module comprising:

a first sheet portion provided with a first cell side electrode layer connected to the first pole of the coin cell, a terminal side electrode layer connected to a first pole side terminal of the cell holder, and an insulating layer configured to insulate the first cell side electrode layer and the terminal side electrode layer from each other;

a second sheet portion provided with a second cell side electrode layer connected to a portion of the second surface of the coin cell;

a wireless communication unit configured to be disposed in a vicinity of the side surface of the coin cell positioned between an edge of the first sheet portion and an edge of the second sheet portion and to perform wireless communication with an external device;

a switch unit configured to switch between a closed state and an opened state, the closed state being a state in which the first cell side electrode layer and the terminal side electrode layer are electrically connected to each other and the opened state being a state in which the first cell side electrode layer and the terminal side electrode layer are electrically disconnected from each other; and a controller configured to cause the switch unit to switch between the closed state and the opened state based on a result of communication performed by the wireless communication unit.

2. The power supply control module according to claim 1, wherein:

the insulating layer is configured to cover the entire first pole when the power supply control module is attached to the coin cell; and the first sheet portion is configured not to stick out beyond the first surface of the coin cell when the insulating layer covers the entire first pole.

3. The power supply control module according to claim 1, wherein the wireless communication unit is configured to communicate with a portable wireless communication terminal device as the external device.

4. The power supply control module according to claim 1, wherein the controller is configured to:

perform predetermined verification between the power supply control module and the external device;

cause the wireless communication unit to perform encrypted communication based on the verification in a case where the verification is successful; and cause the switch unit to switch between the closed state and the opened state based on a result of the encrypted communication.

5. The power supply control module according to claim 1, wherein the controller is configured to:

detect a potential difference between the first cell side electrode layer and the terminal side electrode layer; and cause the wireless communication unit to transmit a signal indicating that there is a short circuit between the first cell side electrode layer and the terminal side electrode layer to the external device in a case where the switch unit is in the opened state and the potential difference is zero.

6. The power supply control module according to claim 1, wherein the insulating layer is formed of polyimide.

7. The power supply control module according to claim 1, wherein:

the first sheet portion, the second sheet portion, and a bridge portion configured to connect the first sheet portion and the second sheet portion to each other are formed by using a flexible board; and the wireless communication unit, the switch unit, and the controller are disposed on the bridge portion.

8. The power supply control module according to claim 1, wherein the first sheet portion is provided with an outer edge of which a portion is curved inward.

9. The power supply control module according to claim 1, wherein a hole is formed in the first sheet portion.

10. The power supply control module according to claim 1, wherein the second sheet portion is provided with a gap filling member on a surface that is on a side opposite to the second cell side electrode layer side, the gap filling member having a predetermined thickness, cushioning properties, and elasticity.

* * * * *